United States Patent
Pan et al.

(10) Patent No.: US 8,854,844 B2
(45) Date of Patent: Oct. 7, 2014

(54) AC/DC CONVERTER WITH PASSIVE POWER FACTOR CORRECTION CIRCUIT AND METHOD OF CORRECTING POWER FACTOR

(71) Applicant: Hep Tech Co., Ltd., Taichung (TW)

(72) Inventors: Ching-Tsai Pan, Hsinchu (TW); Po-Yen Chen, Taipei (TW); Ta-Sheng Hung, Taichung (TW)

(73) Assignee: Hep Tech Co., Ltd, Taichung (TW)

( * ) Notice: Subject to any disclaimer, the term of this patent is extended or adjusted under 35 U.S.C. 154(b) by 0 days.

(21) Appl. No.: 14/096,749

(22) Filed: Dec. 4, 2013

(65) Prior Publication Data

US 2014/0153305 A1    Jun. 5, 2014

(30) Foreign Application Priority Data

Dec. 5, 2012 (TW) .............................. 101145614 A

(51) Int. Cl.
*H02M 1/14* (2006.01)

(52) U.S. Cl.
USPC ............................................ 363/44; 323/206

(58) Field of Classification Search
USPC ................................ 363/39, 44–48; 323/206
See application file for complete search history.

(56) References Cited

U.S. PATENT DOCUMENTS

| | | | | |
|---|---|---|---|---|
| 6,008,589 A | * | 12/1999 | Deng et al. | 315/209 R |
| 8,427,064 B2 | * | 4/2013 | Zhang | 315/247 |
| 8,643,294 B2 | * | 2/2014 | Pan et al. | 315/200 R |
| 8,716,944 B2 | * | 5/2014 | Pan et al. | 315/200 R |
| 2008/0265847 A1 | * | 10/2008 | Woo et al. | 323/206 |
| 2014/0029318 A1 | * | 1/2014 | Chen et al. | 363/44 |
| 2014/0103899 A1 | * | 4/2014 | Chen et al. | 323/311 |

* cited by examiner

*Primary Examiner* — Jessica Han
(74) *Attorney, Agent, or Firm* — Ming Chow; Sinorica, LLC

(57) ABSTRACT

An AC/DC converter includes a rectifier circuit and a power factor correction circuit. An input port of the rectifier circuit receives an alternate current. The power factor correction circuit includes a first inductor, a second inductor, a first capacitor, a second capacitor, a first diode and a second diode. An end of the first inductor electrically connects to a positive pole of an output port of the rectifier circuit, and the other end electrically connects to a ground terminal of the output port through two parallel series routes which are bridged by the first diode. Wherein a series route contains the first capacitor and the second diode, and the other series route contains the second inductor and the second capacitor. The second capacitor is provided for parallel connecting with a loading. In this way, the input current could be controlled to increase the power factor effectively.

8 Claims, 8 Drawing Sheets

AC/DC CONVERTER WITH PASSIVE POWER FACTOR CORRECTION CIRCUIT AND METHOD OF CORRECTING POWER FACTOR

The current application claims a foreign priority to the patent application of Taiwan No. 101145614 filed on Dec. 5, 2012.

BACKGROUND OF THE INVENTION

1. Technical Field

The present invention relates generally to a power factor correction circuit, and more particularly to an AC/DC converter with passive power factor correction circuit and a method of correcting power factor.

2. Description of Related Art

Typically, an AC/DC converter is used to convert an alternate current (AC) into a direct current (DC). A conventional AC/DC converter is shown in FIG. 1, which includes a rectifier circuit 10 and an output capacitor C, wherein the rectifier circuit 10 converts an alternate current (AC) provided by an AC power supply S into a direct circuit (DC), and the output capacitor C bridges over the output of the rectifier circuit 10 and are in parallel with a loading R. While the AC/DC converter is working, the phases of the input voltage $v_{in}$ and the input current $i_{in}$ of the AC are different, which leads to low power factor and poor total harmonic distortion. In addition, the output capacitor C is charged only when a voltage of the DC is higher than that of the output capacitor C, hence the charging time of the output capacitor C is shortened. As a result, the conduction time of diodes in the rectifier circuit 10 is also shortened, which increases the peak value of the conduction current, distorts the waveform of the input current $i_{in}$, and lowers the power factor. Low power factor not only wastes energy, but also poses unnecessary burdens for the power supply systems of the power company. Therefore, the AC/DC converter with power factor correction circuit is emerged.

In general, there are two types of the conventional power factor correction circuits of the AC/DC converters, which are active type and passive type. The active power factor correction circuit controls the input current with active switch components, and this type of the power factor correction circuit has several advantages, such as the power factor could excess 0.99, and the total harmonic distortion could be less than 10%. And moreover, the active power factor correction circuit is compatible with a wider range of input voltage, generates a stable output voltage, and it's unaffected by the variation of output power. However, the active power factor correction circuit has several drawbacks too, such as higher cost due to additional active switches, high electromagnetic noises, and low durability. Please refer to FIG. 2, the conventional passive power factor correction circuit has an inductor L in serial with the input of the rectifier circuit 10 of the AC/DC converter. Since the structure of the passive power factor is simple, it is more durable. And there is no active switch which causes electromagnetic noises needed. Because the inductor L has to be made from a bulk of silicon steel plate, its size increases along with the decreasing of output power and rated input voltage, and the power factor could merely achieve around 75%, which is insufficient to meet the demands nowadays. If the power factor of passive power factor correction circuits of AC/DC converters could be increased, those AC/DC converters which have more expensive active power factor correction circuits could be replaced. Besides, in order to reduce the ripple of the output voltage of the loading R, the aforementioned output capacitor C has to adopt a high capacity electrolytic capacitor, but the electrolytic capacitor is easy to leak out the contained electrolyte due to being heated for a long period of time, which shortens life of circuit.

BRIEF SUMMARY OF THE INVENTION

In view of the above, the primary objective of the present invention is to provide an AC/DC converter and a method of correcting a power factor, which effectively increases a power factor of the AC/DC converter, and has no need to adopt an electrolytic capacitor, thus prolongs life of the AC/DC converter.

The present invention provides an AC/DC converter which includes a rectifier circuit and a power factor correction circuit, wherein the rectifier circuit converts an alternate current (AC) into a direct current (DC), which has an input port and an output port, wherein the input port receives the AC, and the DC comes out via the output port; the power factor correction circuit includes a first inductor, a second inductor, a first capacitor, a second capacitor, a first diode and a second diode, an end of the first inductor is electrically connected to a positive pole of the output port of the rectifier circuit, and the other end thereof is electrically connected to two series routes which are in parallel to each other, wherein the first capacitor and the second diode are on one of the series route; an end of the first capacitor is electrically connected to the first inductor, and the other end thereof is electrically connected to a cathode of the second diode, and an anode of the second diode is electrically connected to a ground terminal of the output port of the rectifier circuit; the second inductor and the second capacitor are on the other series route; an end of the second inductor is electrically connected to the first inductor, and the other end thereof is electrically connected to an end of the second capacitor, the other end of the second capacitor is electrically connected to the ground terminal of the output port of the rectifier circuit; the second capacitor is connected to a loading in parallel; an anode of the first diode is electrically connected to a point between the first capacitor and the cathode of the second diode, and a cathode of the first diode is electrically connected to a point between the second inductor and the second capacitor.

According to the aforementioned concepts, the present invention further provides a method of correcting power factor with a power factor correction circuit, wherein the power factor correction circuit includes a first inductor, a second inductor, a first capacitor, a second capacitor, a first diode and a second diode, wherein an end of the first inductor is electrically connected to a positive pole of a DC power supply, and the other end thereof is electrically connected to two series routes which are in parallel to each other, wherein the first capacitor and the second diode are on one of the series route; an end of the first capacitor is electrically connected to the first inductor, and the other end thereof is electrically connected to a cathode of the second diode, and an anode of the second diode is electrically connected to a ground terminal of the DC power supply; the second inductor and the second capacitor are on the other series route; an end of the second inductor is electrically connected to the first inductor, and the other end thereof is electrically connected to an end of the second capacitor, the other end of the second capacitor is electrically connected to the ground terminal of the DC power supply; the second capacitor is connected to a loading in parallel; an anode of the first diode is electrically connected to a point between the first capacitor and the cathode of the second diode, and a cathode of the first diode is electrically connected to a point between the second inductor and the second capacitor; the method includes the steps of:

A. Receive a direct current (DC) from the DC power supply.

B. Conduct the second diode, and provide energy into the loading from the first capacitor and the DC power supply until the second diode is cut off.

C. Provide energy into the loading from the DC power supply until the first diode is conducted.

D. Charge the first capacitor by the DC power supply, and provide energy into the loading until the first diode is cut off.

E. Provide energy into the loading from the DC power supply until the second diode is conducted; and F. Repeat the steps from the step B to the step E until the DC power supply stops providing the DC.

With such design, it may prolong the conduction time of diodes in the rectifier circuit to control the input current of the AC power supply, which could increase the power factor effectively.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
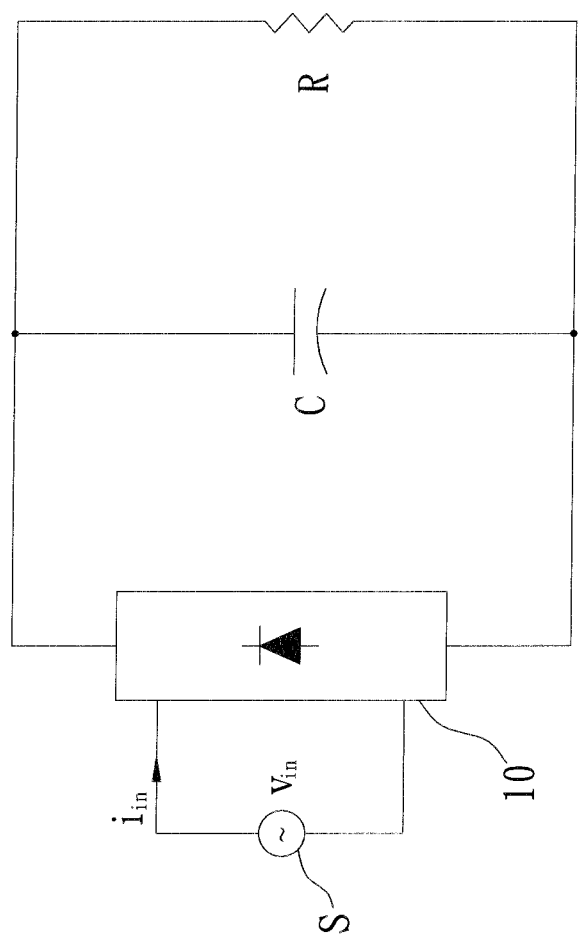
FIG. 1 is a circuit diagram of the conventional AC/DC converter.
Figure 2:
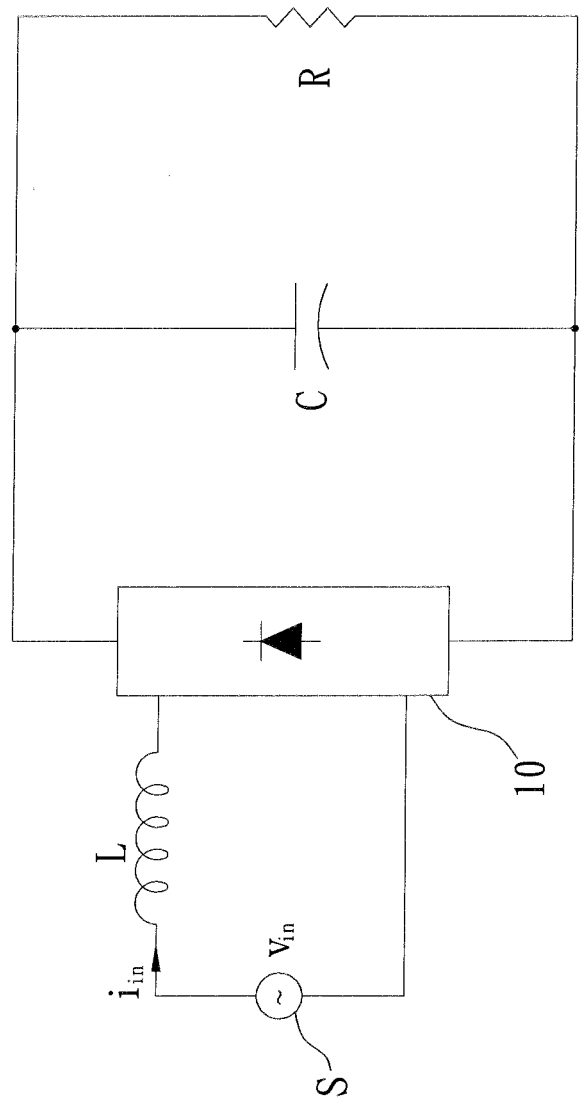
FIG. 2 is a circuit diagram of the conventional AC/DC converter with the passive power factor correction circuit.
Figure 3:
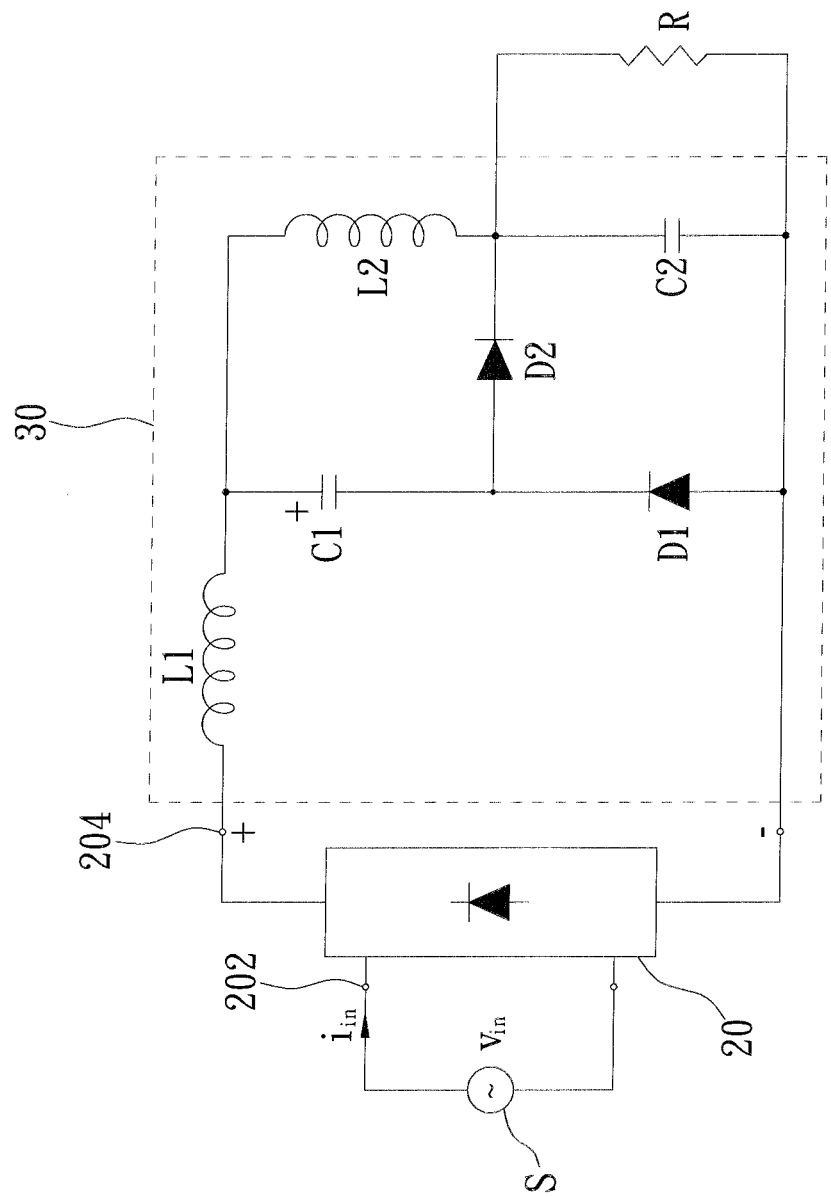
FIG. 3 is a circuit diagram of the AC/DC convert with passive power factor correction of a preferred embodiment of the present invention.

As shown in FIG. 3, an AC/DC converter of the preferred embodiment of the present invention includes a rectifier circuit 20 and a power factor correction circuit 30.

The rectifier circuit 20 is a full-wave bridge rectifier in the current embodiment, which has an input port 202 and an output port 204. The input port 202 is electrically connected to an AC power supply S, which provides an input voltage $v_{in}$ and an input current $i_{in}$ to the rectifier circuit 20. In the present embodiment, the AC power supply S is a city power line provided by a power station, but this is not the limitation of the present invention. In another embodiment, the input port 202 is connected to the city power line through a transformer which increases or decreases the voltage. Because of the rectifier circuit 20, the AC power supply S and the rectifier circuit 20 could be seen as a DC power supply as a whole, which sends a DC out via the output port 204 with twice the frequency.

The power factor correction circuit 30 includes a first inductor L1, a second inductor L2, a first capacitor C1, a second capacitor C2, a first diode D1, and a second diode D2.

An end of the first inductor L1 is electrically connected to a positive pole of the output port 204, and the other end of the first inductor L1 electrically connects to two series routes which are in parallel to each other. The first capacitor C 1 and the second diode D2 in series are on one of the series routes. The first capacitor C1 is a polarity capacitor in the present embodiment with a positive pole electrically connected to the first inductor L1, and a negative pole electrically connected to a cathode of the second diode D2. An anode of the second diode D2 is electrically connected a ground terminal of the output port 204 of the rectifier circuit 20. The second inductor L2 and the second capacitor C2 in series are on the other series route, wherein an end of the second inductor L2 is electrically connected to the first inductor L1, and the other end thereof is electrically connected to an end of the second capacitor C2; the other end of the second capacitor C2 is electrically connected to the ground terminal of the output port 204 of the rectifier circuit 20. The first diode D1 bridges the series routes, wherein an anode of the first diode D1 is electrically connected to a point between the cathode of the first capacitor C1 and the cathode of the second diode D2, and a cathode of the first diode D1 is electrically connected to a point between the second inductor L2 and the second capacitor C2. The second capacitor C2 is connected to a loading R in parallel. In practice, the first capacity C1 could be a non-polarity capacitor.

With the aforementioned circuit structure, the power factor correction circuit 30 works as follows:

During each half cycle of the AC provided by the AC power supply S (i.e. the each cycle of the DC), the power factor correction circuit 30 receives the AC from the rectifier circuit 20, and goes into 4 different states sequentially, which are defined as a first state, a second state, a third state, and a fourth state.

Figure 4:
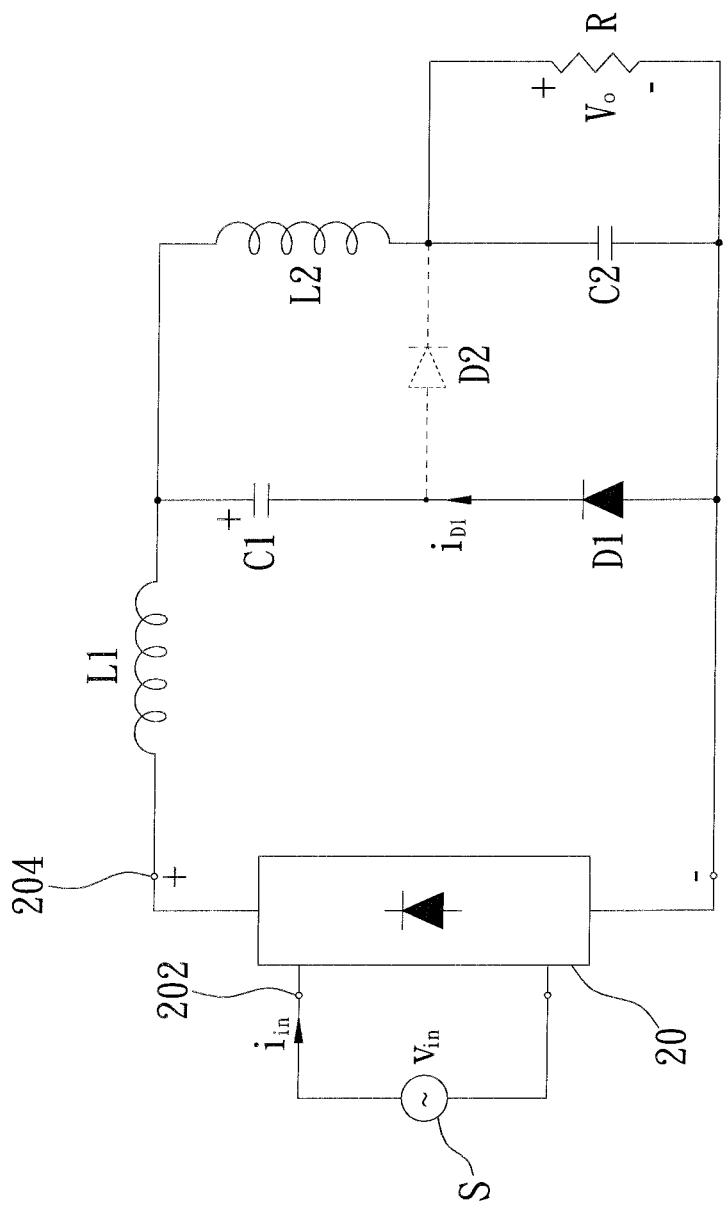
FIG. 4 is a circuit diagram of the first state of the preferred embodiment of the present invention.

When a voltage of the first capacitor C1 is higher than a total voltage of the first inductor L1 and the second capacitor C2, the second diode D2 is conducted, and generates a conduction current $i_{D2}$. It is the first state of the power factor correction circuit 30, and the circuit diagram is shown in FIG. 4. At this time, the first capacitor C1 releases energy to the second capacitor C2 and the second inductor L2, and the DC flows through the first inductor L1, charges the second inductor L2 and the second capacitor C2, and provides energy into the loading R to generate an output voltage $V_o$ until the second diode D2 is cut off (that is, when the voltage of the first capacitor C1 is lower than the total voltage of the first inductor L1 and the second capacitor C2), and the first state ends. At the first state, the first inductor L1 and the first capacitor C1 form a resonant circuit to lower a harmonic of the input current $i_{in}$ of the AC power supply S.

Figure 5:
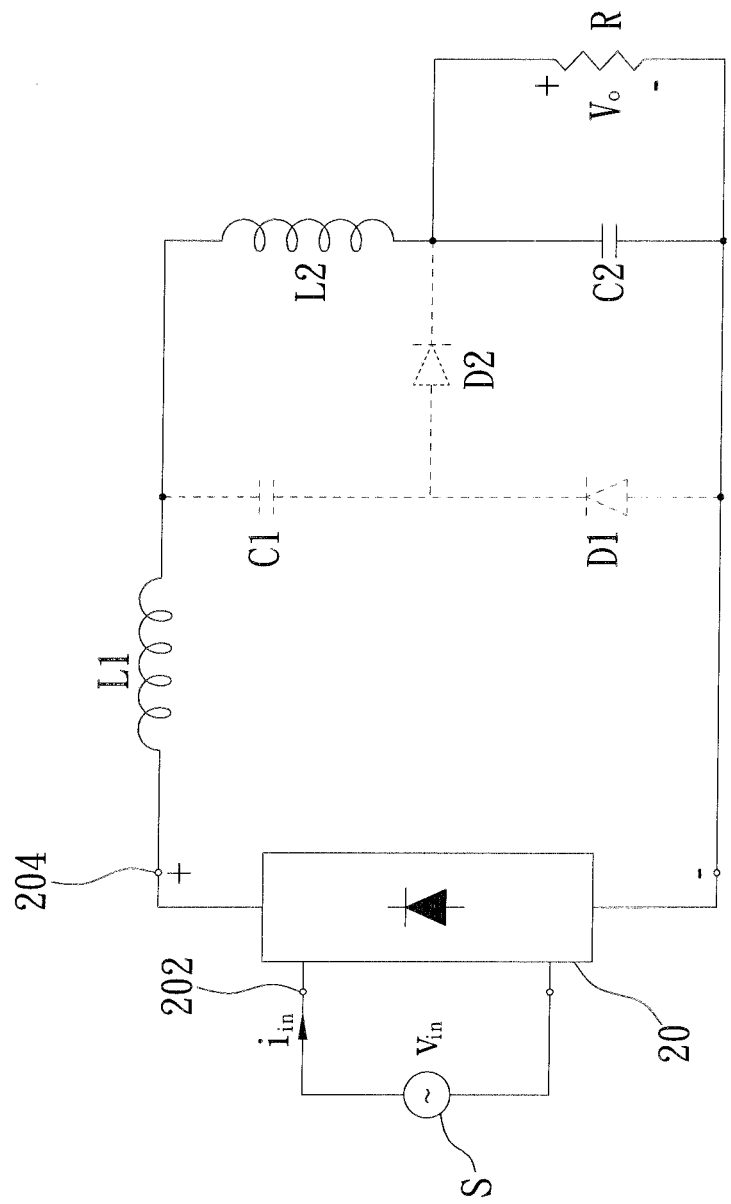
FIG. 5 is a circuit diagram of the second state of the preferred embodiment of the present invention.

When the voltage of the first capacitor C1 is lower than the total voltage of the first inductor L1 and the second capacitor C2, the second diode D2 is cut off. It is the second state of the power factor correction circuit 30, and the circuit diagram is shown in FIG. 5. At this time, the DC flows through the first inductor L1, charges the second inductor L2 and the second capacitor C2, and provides energy into the loading R until the first diode D1 is conducted (that is, when the voltage of the DC is higher than the total voltage of the first inductor L1, the first capacitor C1, and the second capacitor C2), and the second state ends.

Figure 6:
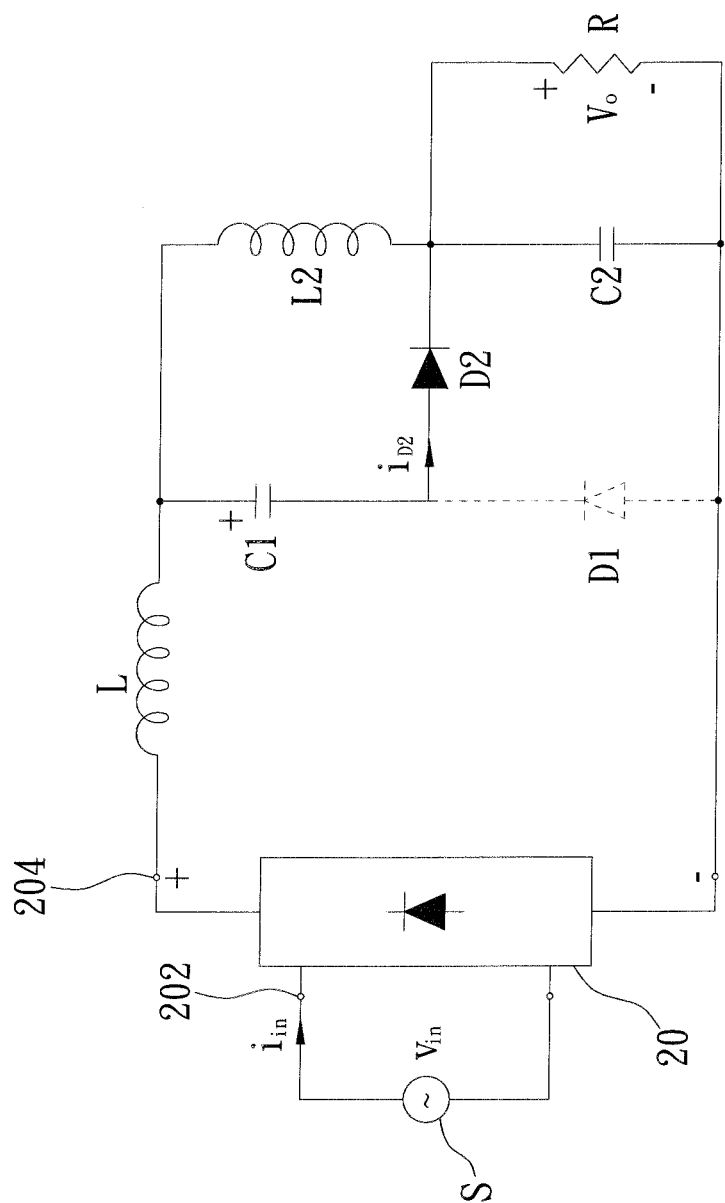
FIG. 6 is a circuit diagram of the third state of the preferred embodiment of the present invention.

When the voltage of the DC is higher than the total voltage of the first inductor L1, the first capacitor C1, and the second capacitor C2, the first diode D1 is conducted to generate a conduction current $i_{D1}$. It is the third state of the power factor correction circuit 30, and the circuit diagram is shown in FIG. 6. At this time, the DC flows through the first inductor L1, charges the first capacitor C1, the second inductor L2, and the second capacitor C2, and provides energy into the loading R until the first diode D1 is cut off (that is, when the voltage of the DC is lower than the total voltage of the first inductor L1, the first capacitor C1, and the second capacitor C2), and the third state ends.

Figure 7:
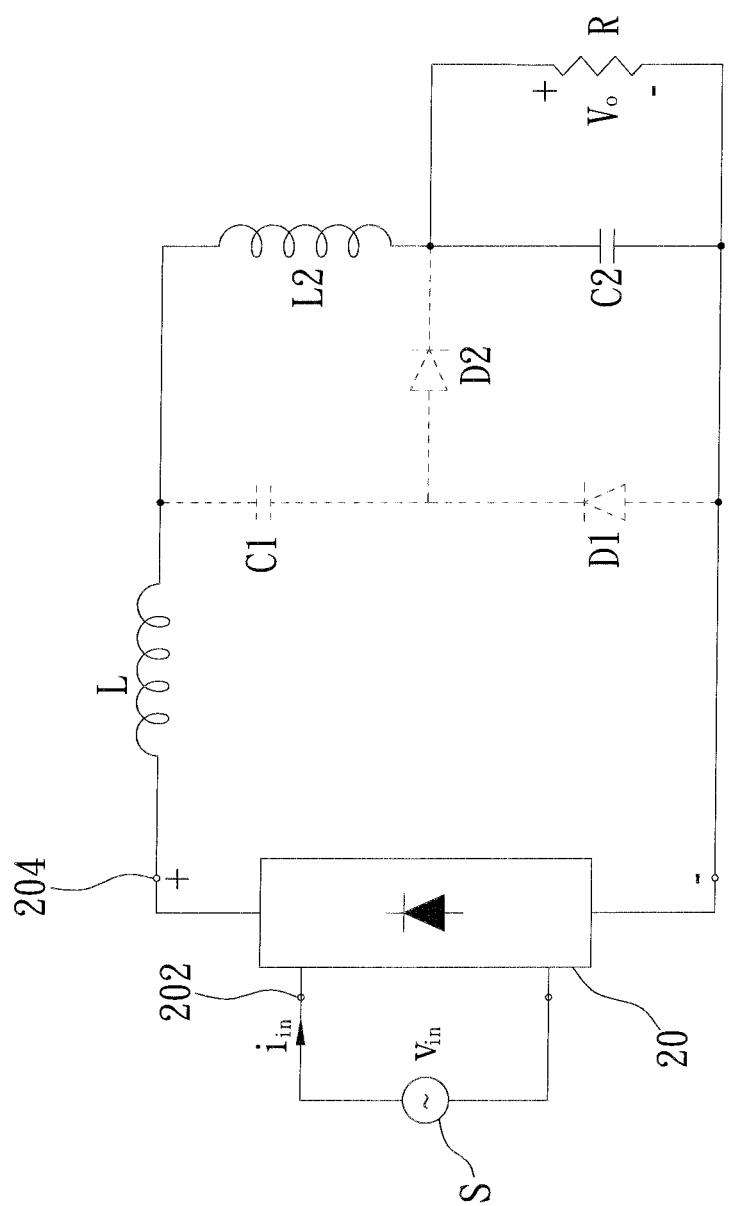
FIG. 7 is a circuit diagram of the fourth state of the preferred embodiment of the present invention.

When the voltage of the DC is lower than the total voltage amount of the first inductor L1, the first capacitor C1, and the second capacitor C2, the first diode D1 is cut off. It is the fourth state of the power factor correction circuit 30, and the circuit diagram is shown in FIG. 7. At this time, the DC flows through the first inductor L1, charges the second inductor L2 and the second capacitor C2, and provides energy into the loading R until the second diode D2 is conducted (that is, when the total voltage of the first inductor L1 and the second capacitor C2 is lower than the voltage of the first capacitor C1), and the third state ends. The power factor correction circuit 30 then goes into the next half cycle of the AC provided by the AC power supply S, and repeats the first state to the fourth state again and again until the AC power supply S stops providing the AC to the rectifier circuit 20.

Figure 8:
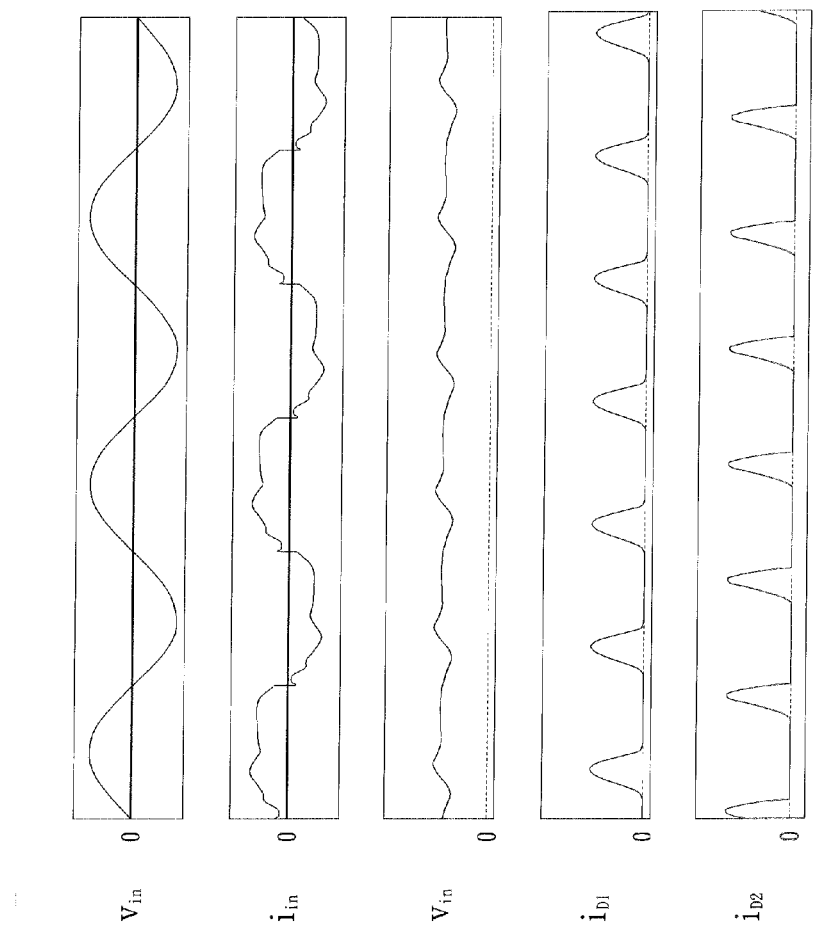
FIG. 8 is an oscillogram of the AC/DC converter of the preferred embodiment of the present invention.

FIG. 8 shows the waveforms of the input voltage $v_{in}$, the input current the output voltage $V_o$, the conduction current $i_{D1}$ of the first diode D1, and the conduction current $i_{D2}$ of the second diode D2 of the aforementioned AC/DC converter with passive power factor correction. Wherein, the loading R is a resistor with 100 ohms as an example, the first inductor L1 is 55 mH, the second inductor L2 is 550 mH, the first capacitor C1 is 10 µF, the second capacitor C2 is 10 µF, and the input voltage $v_{in}$ of the AC power supply S is a sine wave of 110 Vrms. As shown in the FIG. 8, the waveform of the input current $i_{in}$ has been corrected to be an approximate sine wave, and the power factor of the AC/DC converter is 0.959, which is significantly higher than the prior art. In addition, the resonant circuit formed by the first inductor L1 and the first capacitor C1 also effectively lowers the harmonic of the input current $i_{in}$ of the AC power supply S.

As described above, the resonant circuit formed by the first inductor L1 and the first capacitor C1 could prolong the conduction time of the diodes of the rectifier circuit 20 to control the input current $i_{in}$ of the AC power supply S. A resonant circuit formed by the first capacitor C1, the first diode D1, the second diode D2, the second inductor L2, and the second capacitor C2 could lower the ripple of the output voltage $V_o$ sent to the loading R, and increase the power factor of the AC power supply S. Preferably, the inductance of the second inductor L2 is no less than ten times of the inductance of the first inductor L1, which could control the charging/discharging time effectively to adjust the lasting time of the first state, the second state, the third state and the fourth state. Besides, the second inductor L2 also has the effect of energy storage and wave filtering, which could provide energy to the loading R and suppress the ripple of the current of the loading R. In this way, the second capacitor C2 could be selected from non-electrolytic capacitors (for example, ceramic capacitors or tantalum capacitors) instead of the conventional electrolytic capacitors, which prolongs life of circuits.

It must be pointed out that the embodiments described above are only some preferred embodiments of the present invention. All equivalent structures and methods which employ the concepts disclosed in this specification and the appended claims should fall within the scope of the present invention.

What is claimed is:
1. An AC/DC converter, comprising:
 a rectifier circuit, which converts an alternate current (AC) into a direct current (DC), having an input port and an output port, wherein the input port receives the AC, and the DC comes out via the output port; and
 a power factor correction circuit comprising a first inductor, a second inductor, a first capacitor, a second capacitor, a first diode and a second diode;
  wherein an end of the first inductor is electrically connected to a positive pole of the output port of the rectifier circuit, and the other end thereof is electrically connected to two series routes which are in parallel to each other, wherein the first capacitor and the second diode are on one of the series route; an end of the first capacitor is electrically connected to the first inductor, and the other end thereof is electrically connected to a cathode of the second diode, and an anode of the second diode is electrically connected to a ground terminal of the output port of the rectifier circuit; the second inductor and the second capacitor are on the other series route; an end of the second inductor is electrically connected to the first inductor, and the other end thereof is electrically connected to an end of the second capacitor, the other end of the second capacitor is electrically connected to the ground terminal of the output port of the rectifier circuit; the second capacitor is connected to a loading in parallel; an anode of the first diode is electrically connected to a point between the first capacitor and the cathode of the second diode, and a cathode of the first diode is electrically connected to a point between the second inductor and the second capacitor.

2. The AC/DC converter of claim 1, wherein the inductance of the second inductor is no less than ten times of the inductance of the first inductor.

3. The AC/DC converter of claim 1, wherein the second capacitor is a capacitor other than an electrolytic capacitor.

4. A method of correcting power factor with a power factor correction circuit, wherein the power factor correction circuit comprises a first inductor, a second inductor, a first capacitor, a second capacitor, a first diode and a second diode, wherein an end of the first inductor is electrically connected to a positive pole of a DC power supply, and the other end thereof is electrically connected to two series routes which are in parallel to each other, wherein the first capacitor and the second diode are on one of the series route; an end of the first capacitor is electrically connected to the first inductor, and the other end thereof is electrically connected to a cathode of the second diode, and an anode of the second diode is electrically connected to a ground terminal of the DC power supply; the second inductor and the second capacitor are on the other series route; an end of the second inductor is electrically connected to the first inductor, and the other end thereof is electrically connected to an end of the second capacitor, the other end of the second capacitor is electrically connected to the ground terminal of the DC power supply; the second capacitor is connected to a loading in parallel; an anode of the first diode is electrically connected to a point of the series route between the first capacitor and the cathode of the second diode, and a cathode of the first diode is electrically connected to a point of the series route between the second inductor and the second capacitor; the method comprising the steps of:
 A. receiving a direct current (DC) from the DC power supply;
 B. conducting the second diode, and providing energy into the loading from the first capacitor and the DC power supply until the second diode is cut off;
 C. providing energy into the loading from the DC power supply until the first diode is conducted;

D. charging the first capacitor by the DC power supply, and providing energy into the loading until the first diode is cut off;
E. providing energy into the loading from the DC power supply until the second diode is conducted; and
F. repeating the steps from the step B to the step E until the DC power supply stops providing the DC.

5. The method of claim 4, wherein the second diode is conducted when a voltage of the first capacitor is higher than a total voltage of the first inductor and the second capacitor, and the second diode is cut off until the voltage of the first capacity is lower than the total voltage the of first inductor and the second capacitor in the step B.

6. The method of claim 4, wherein the first diode is conducted when a voltage of the DC is higher than a total voltage of the first inductor, the first capacitor, and the second capacitor.

7. The method of claim 4, wherein the first diode is cut off when a voltage of the DC is lower than a total voltage of the first inductor, the first capacitor, and the second capacitor.

8. The method of claim 4, wherein the second diode is conducted when a voltage of the first capacitor is higher than a total voltage of the first inductor and the second capacitor in the step E.

* * * * *